(12) United States Patent
Bai et al.

(10) Patent No.: US 10,171,408 B2
(45) Date of Patent: *Jan. 1, 2019

(54) FOLLOWING/SUBSCRIBING FOR PRODUCTIVITY APPLICATIONS

(71) Applicant: International Business Machines Corporation, Armonk, NY (US)

(72) Inventors: Kun Bai, Hartsdale, NY (US); Di Ling Chen, Beijing (CN); Christian B. Kau, Los Altos, CA (US); Zhi Cheng Liu, Beijing (CN); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,075

(22) Filed: Jun. 27, 2017

(65) Prior Publication Data

US 2017/0295129 A1  Oct. 12, 2017

Related U.S. Application Data

(63) Continuation of application No. 14/721,768, filed on May 26, 2015, now Pat. No. 9,762,527.

(51) Int. Cl.
*H04L 12/58* (2006.01)
*H04L 29/08* (2006.01)

(52) U.S. Cl.
CPC .............. *H04L 51/32* (2013.01); *H04L 51/04* (2013.01); *H04L 51/24* (2013.01); *H04L 51/36* (2013.01); *H04L 67/1095* (2013.01)

(58) Field of Classification Search
CPC ......... H04L 51/56; H04L 51/32; H04L 51/04; H04L 51/24
USPC ................................ 709/206, 248, 200, 201
See application file for complete search history.

(56) References Cited

U.S. PATENT DOCUMENTS

| | | | |
|---|---|---|---|
| 6,212,548 B1 | 4/2001 | Desimone et al. | |
| 7,299,267 B1 | 11/2007 | Pedersen et al. | |
| 2006/0080432 A1 | 4/2006 | Spataro et al. | |
| 2008/0291278 A1* | 11/2008 | Zhang | G06K 9/00771 348/159 |
| 2010/0185951 A1 | 7/2010 | Nichols et al. | |
| 2011/0072114 A1 | 3/2011 | Hoffert et al. | |

OTHER PUBLICATIONS

IBM, "Synchronous/Asynchronous instant messaging chat gateway using an event processing infrastructure", Jun. 28, 2007, pp. 1-3, IP.com, United States.

(Continued)

*Primary Examiner* — El Hadji M Sall
(74) *Attorney, Agent, or Firm* — Sherman IP LLP; Kenneth L. Sherman; Steven Laut (57) ABSTRACT

A method for following asynchronous and synchronous productivity application communications includes providing, by an update processor, a targeted medium with a notification for changes associated with the productivity application communication based on a promotion of the productivity application communication to the targeted medium. The update processor further receives subscriptions for receiving update notifications through the targeted medium for the changes associated with the productivity application communication.

20 Claims, 7 Drawing Sheets

(56) References Cited

OTHER PUBLICATIONS

Anonymous, "A system and method for document sharing and compilation in real time through Instant Messaging Chat", Jun. 23, 2011, pp. 1-5, IP.com, United States.
Mell, P., et al., "The NIST Definition of Cloud Computing", National Institute of Standards and Technology Special Publication 800-145, Sep. 2011, pp. 1-7, U.S. Department of Commerce, United States.
List of IBM Patents or Patent Applications Treated as Related.

* cited by examiner

FOLLOWING/SUBSCRIBING FOR PRODUCTIVITY APPLICATIONS

BACKGROUND

One or more embodiments relate to productivity applications, in particular, for following/subscribing and promoting threads from productivity applications with social media platforms.

Conventional productivity applications (e.g., email, customer relationship management (CRM), instant messaging (IM), etc.) represent an obstacle to adopting social software, and are indeed a barrier to making key data available to social media forums (e.g., CONNECTIONS, LINKEDIN, FACEBOOK, TWITTER, etc.). In conventional productivity tools, such as email, IM, and CRM, the information exchanged between a set of users. Meanwhile, social media is partitioned and managed independently. While social media may have an almost unbounded number of participants, productivity applications promote bounded groups (e.g., an email thread comprising five persons, an IM thread comprising three persons, etc.) where the conversation/exchange is confined to these bounded groups.

SUMMARY

One or more embodiments relate to following/subscribing and promoting threads from productivity applications with social media platforms. One embodiment includes a method for following asynchronous and synchronous productivity application communications includes providing, by an update processor, a targeted medium with a notification for changes associated with the productivity application communication based on a promotion of the productivity application communication to the targeted medium. The update processor further receives subscriptions for receiving update notifications through the targeted medium for the changes associated with the productivity application communication.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, the embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
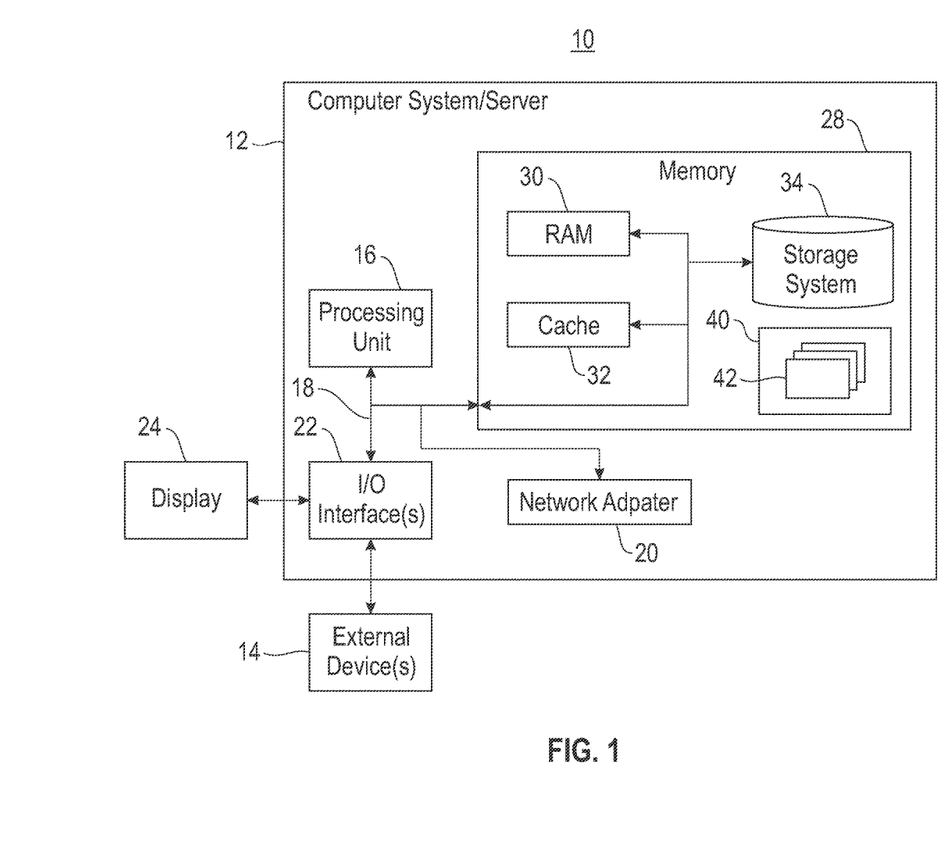
FIG. 1 depicts a cloud computing node, according to an embodiment.

Referring now to FIG. 1, a schematic of an example of a cloud computing node is shown. Cloud computing node 10 is only one example of a suitable cloud computing node and is not intended to suggest any limitation as to the scope of use or functionality of the embodiments described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of the embodiments as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
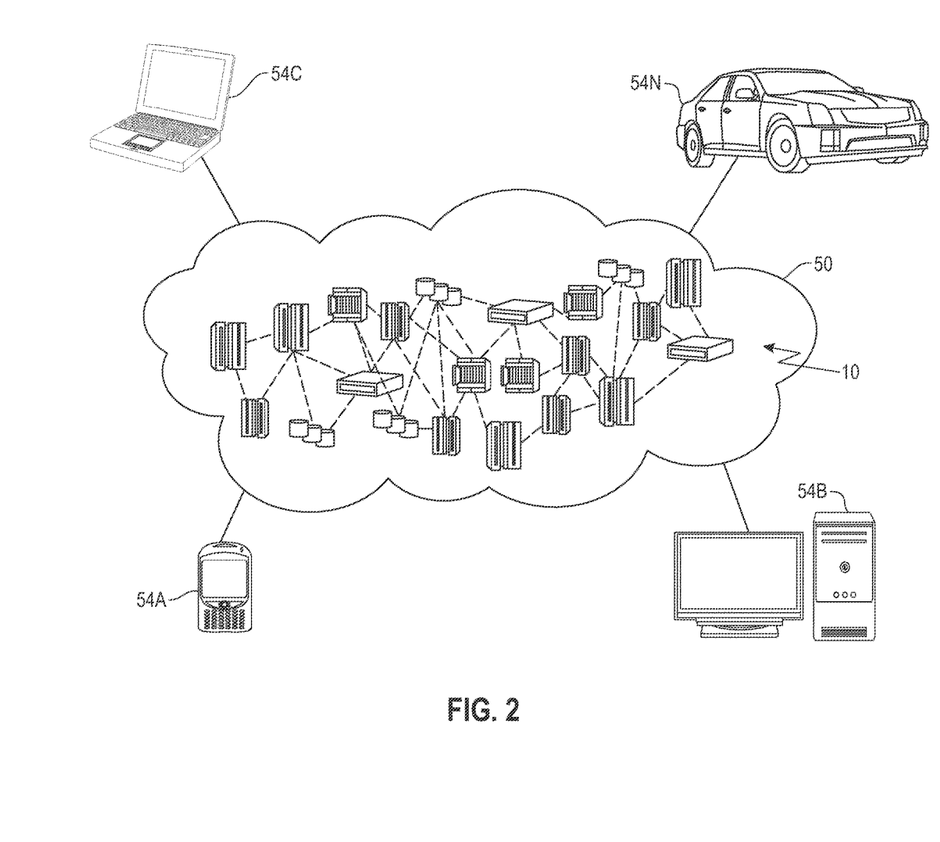
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
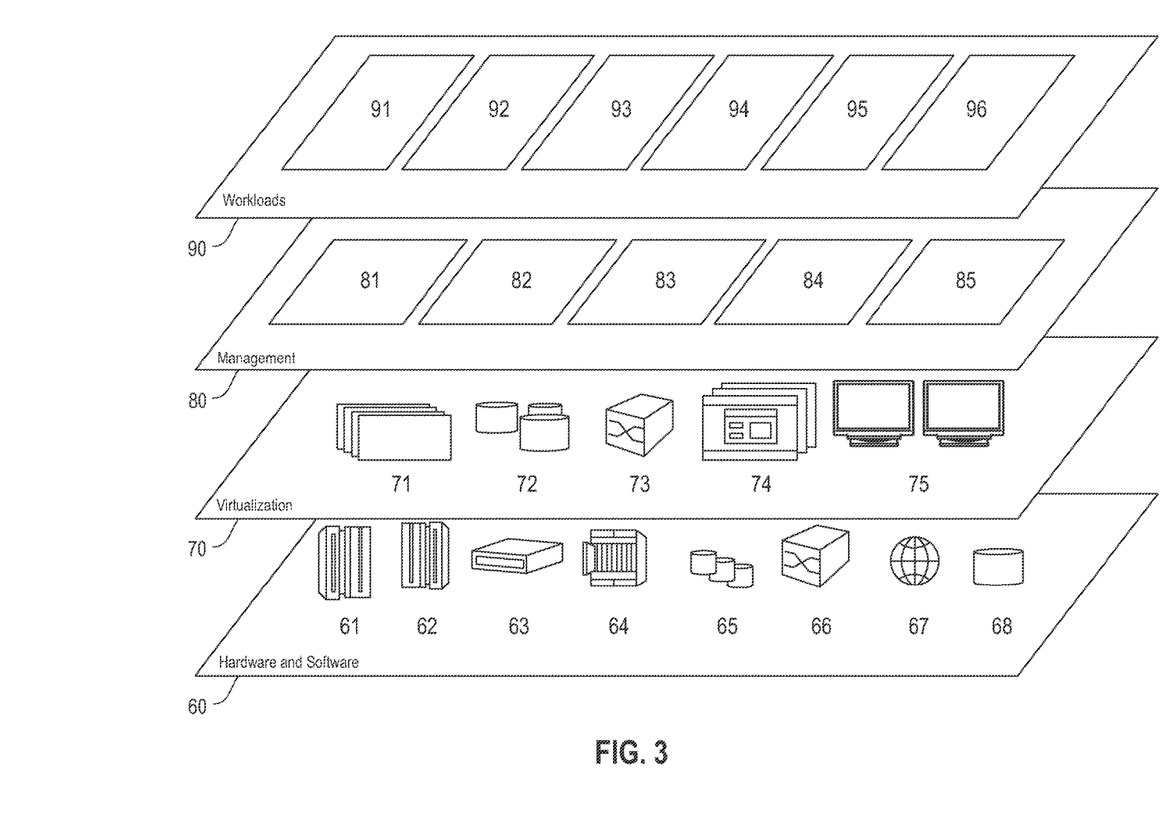
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for following/subscribing and promoting threads from productivity applications with social media platforms 96. As mentioned above, all of the foregoing examples described with respect to FIG. 3 are illustrative only, and the embodiments are not limited to these examples.

It is understood all functions of one or more embodiments as described herein may typically performed by the system 400 (FIG. 4) and system 500 (FIG. 5), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments may be implemented with any type of clustered computing environment now known or later developed.

One or more embodiments provide for discernibly leveraging social media to bring the information shared in a small group of members of a productivity application to others through the act of allowing others to "follow" (or subscribe) from another platform (e.g., social media platform) without disrupting the existing modalities in conventional productivity applications.

In one example, consider an IM chat session that begins with nine (9) persons and ultimately reduces to four (4) persons. The remaining five (5) persons may simply have left the chat owed to a conflict, owed to parallel chats, owed to a customer call, owed to the need to leave the office. etc. The conventional IM applications do not provide a vehicle for these persons that left the chat to continue to follow the IM chat session and updates from the remaining four (4) persons taking part in the chat session. In one embodiment, any member of the chat (chat moderator, person leaving, person remaining) is allowed to select to "follow" the IM chat (e.g., mouse/pointer right click option, check box option, preference entry, dropdown menu, etc.). In one embodiment, the selection to follow the IM chat can occur at the start, end or any point in time in the IM chat. In one embodiment, at the end of the IM chat those that selected to follow the IM chat may receive a notification or update on their preferred social media application/platform/app and a preferred device (e.g., desktop computer, laptop computer, tablet computing device, smart phone, smart watch, etc.). In one example embodiment, the notification may be selected to appear on a user's home page, a particular feed, part of their daily update, etc.

In one or more embodiments, the choice of where to post an update for following may be at the discretion of the user and configurable. In one embodiment, a user can select a thread from a productivity application and promote it to be followed in a social repository, where the superset social data set (e.g. communities. activities, wikis, blogs, etc.) is crawled/spidered (e.g., updating content indexes of other sites' content) to identify candidates/options for locations that may be most appropriate. Thereafter, others may view or follow the communication (e.g., chat, email, blog, etc.) as it continues to evolve, which is often the case in persistent chats.

In another example embodiment, consider an email exchange on an arbitrary topic with a number of subject matter experts (SMEs), for example: "How to create Chef recipes for zLinux." In one or more embodiments, at any point during the email exchange a member of the group may select that this email be promoted to a social repository (e.g., storage device, database, etc.). In one embodiment, the promotion to the social repository provides for a capability for others to follow the thread in a social environment (e.g., social media platform, application, app, etc.) in the location desired, such as a community, wiki, blog, news feed, time line, posts, etc. Consequently, as the email thread makes progress, in one embodiment those following the thread (who may not be originally par of the thread) are able to view the thread as it evolves.

As a concern for security/privacy for any communications that are promoted may arise, in one or more embodiments the productivity communications are tagged or flagged accordingly, which provides awareness for those in the original productivity communication aware of the potential for others to see the thread and/or updates to the thread. Similarly, for any individual that is part of the thread and desires to leave the thread, in one embodiment that individual has the ability to silently follow the thread on his/her personal community or in a broader social repository that others have access. In one embodiment, if a user of a social community were to respond to the social community (e.g., provide a comment, post, a response, etc.) that was derived from an email thread, then this may result in this comment/post/response/etc. circling back to the email system as an update to the parent/original email thread.

Figure 4:
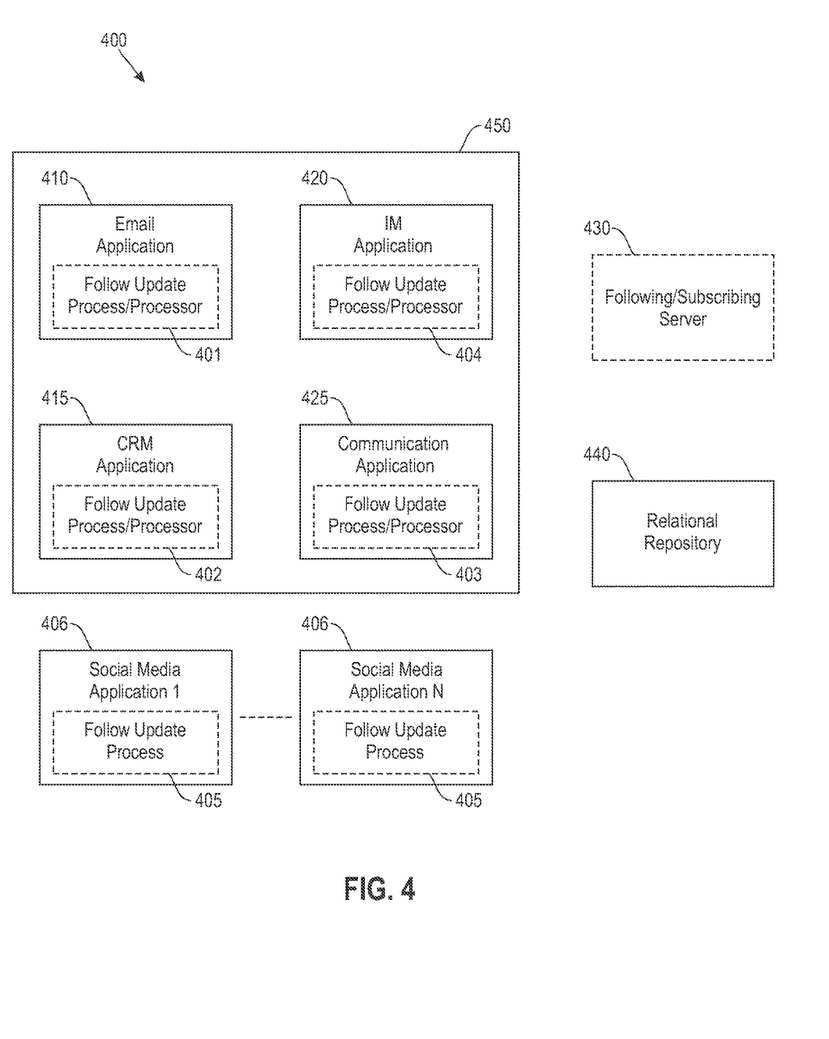
FIG. 4 is a block diagram illustrating a system for following/subscribing and promoting threads from productivity applications with social media applications/platforms, according to an embodiment.

FIG. 4 is a block diagram illustrating a system 400 for following/subscribing and promoting threads from productivity applications with a relational (social) repository 440 (e.g., a storage device, a database, etc.) for notifications through other vehicles, such as social media applications/platforms, according to an embodiment. In one embodiment, the system 400 includes a computing platform 450 (e.g., a desktop computer, a laptop computer, a computing device connecting to online productivity applications, etc.) that may run/execute productivity applications, such as an email application 410, a CRM application 415, an IM application 420, and a communication application 425 (e.g., an internal productivity application, a persistent chat/team room or blog, a persistent information sharing communication application, etc.). In one embodiment, a follow and update process or processor (e.g., follow and update process/processors 401, 402, 403 and 404) are executed or implemented with each productivity application of the computing platform 450. In other embodiments, the follow and update process/processor may be separately executed or implemented from the productivity applications (see, e.g., system 500, FIG. 5). In one embodiment, system 400 further includes social media applications 1-N 406 (where N is a positive integer) that may include a follow and update process 405 for each social media application. In one embodiment, a relational repository 440 receives promotions of productivity communications (e.g., email threads, IM threads, blog entries, etc.) and is accessed by the productivity applications and the social media applications. In one embodiment, a following/subscribing server 430 may handle updates and communications between the productivity application original members of a thread and social media platform followers/subscribers.

In one embodiment, an individual may promote a thread in any productivity application (e.g., the email application 410, the CRM application 415, the IM application 420 and the communication application 425) to the relational repository 440 against which any third party may express an interest in following, which may motivate a relationship between the thread and its evolution and those following the thread thereafter. In one embodiment, promoting the act of following is provided to many peripheral applications through a choice of electronic devices having connectivity with various social media platforms/apps.

Figure 5:
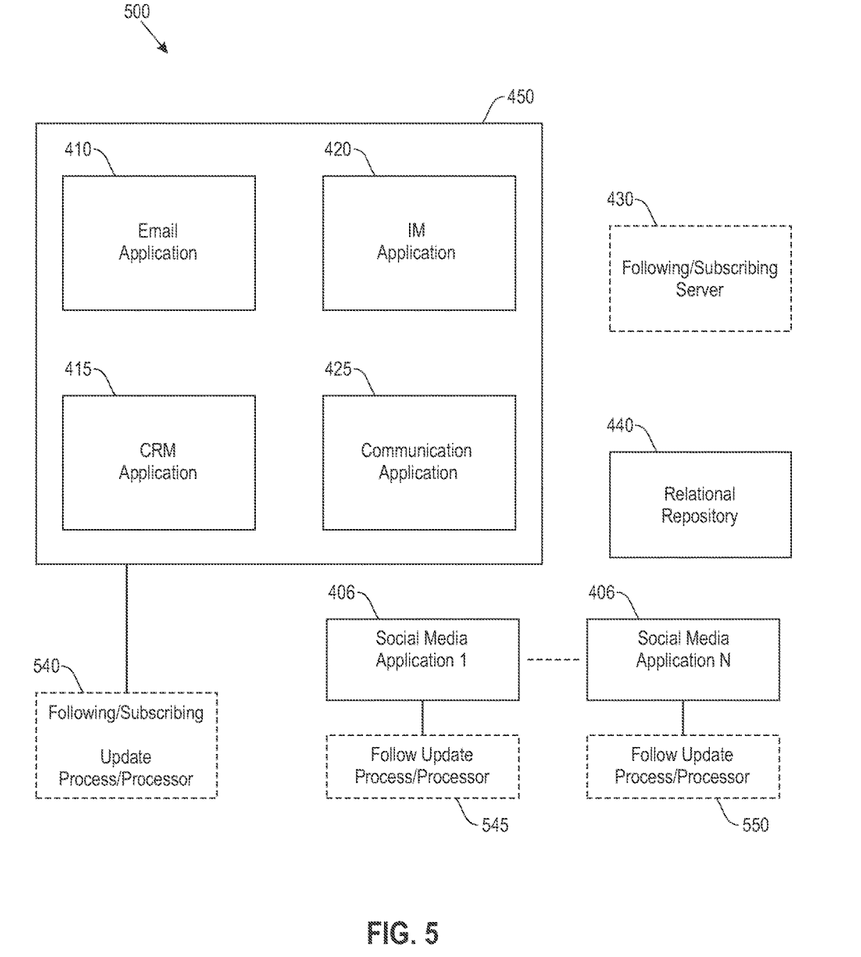
FIG. 5 is a block diagram illustrating another system for following/subscribing and promoting threads from productivity applications with social media applications/platforms, according to an embodiment.

FIG. 5 is a block diagram illustrating another system 500 for following/subscribing and promoting threads from productivity applications with social media applications/platforms/apps, according to an embodiment. In one embodiment, the following/subscribing update process or processor 540 is separately executed or implemented from the productivity applications (e.g., the IM application 420, the email application 410, the CRM application 415, and the communication application 425). In one embodiment, the follow and update process/processor 545 for integrating productivity application following/subscribing for notifications/updates to a social media application 1 406 is separately executed or implemented (as with the follow and update process/processor 550 for a social media application N 406, where N is a positive integer). It should be noted, however, that any combination of either a separately executed or implemented, or an embedded/integrated follow and update process/processor 545/550, the following/subscribing update process or processor 540, follow and update process/processors 401, 402, 403 and 404, and the follow and update process 405 may be implemented in various embodiments.

In one embodiment a data entity (e.g., an IM chat, a calendar invitation, an email or email thread, a conference call, etc.) is tagged (or flagged, marked, etc.) as a potential social artifact. In one embodiment, the tagging may be implemented by setting one or more bits in metadata (or a frame, packet, file, message, communication, etc.). In one embodiment, the tag may be situational motivated by the owner/creator of the data entity, or indeed any participant in the evolution of the data entity. In one embodiment, once tagged, a separate service (e.g., social media service) is triggered. This service may be an executable running on the application server of the running application, a cooperating social media application server (e.g., following/subscribing server 430) running adjacent to the running application. In one embodiment, data entities tagged in this way result in the social media service being both informed and triggered, after which a relationship between the running application and social media service is established surrounding the data entity tagged. In one embodiment, the social media service takes responsibility for placement of the data on a social media server, and in the desired forum (e.g., user specified or system specified) and notifying participants. As new participants are added to, for example, a thread, then the social media service updates its record of the interest group. As the collaboration matures, then so does the social media site, which is kept up to date.

Figure 6:
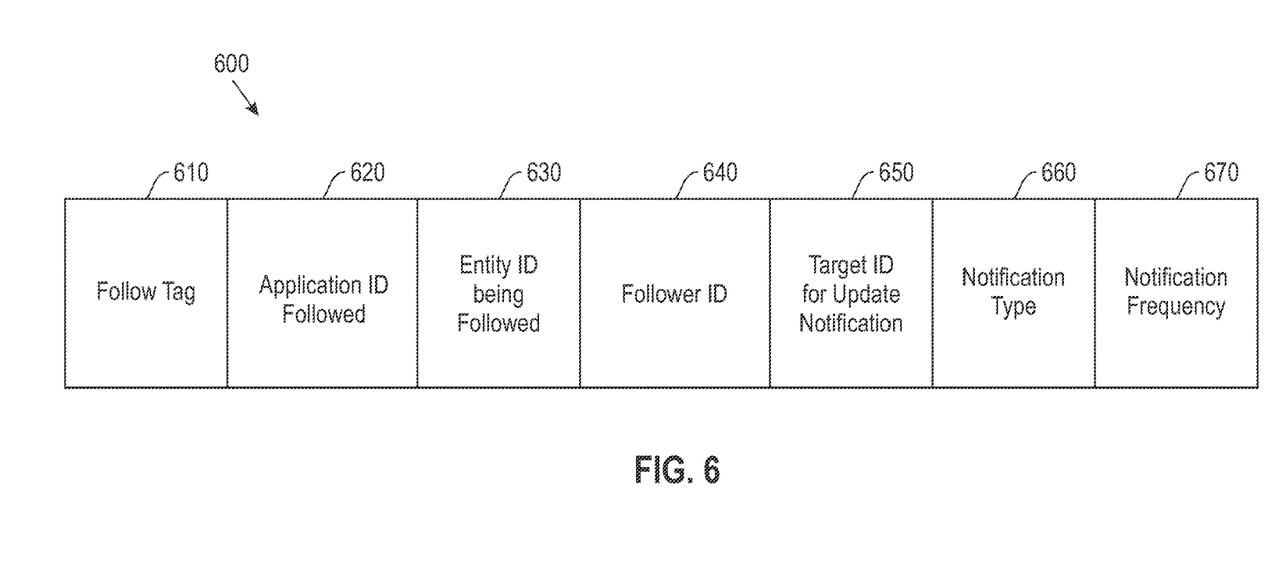
FIG. 6 illustrates metadata for managing an object for promotion from a productivity application, according to an embodiment.

FIG. 6 illustrates an example metadata format 600 for managing an object for promotion from a productivity application, according to an embodiment. In one embodiment, the metadata may include a follow tag field 610, an application ID followed 620 (e.g., the ID of where the entity being followed arose), an entity ID being followed 630, a follower ID 640, a target ID for update or notification 650, a notification type 660 and notification frequency 670. In one embodiment, associated with any entity ID being followed 630 is a data point(s) for who is following (e.g., follower ID 640), and a data point(s) for where they are following (e.g., target ID for update or notification 650). As interactions take place and are progressed within the various applications the associated data-points represent trigger points for broadcasting the relevant updates/communications. In one embodiment, the entity being promoted represents a new object that now has associated metadata to manage this object. For example, an email thread that is promoted to a social conduit has metadata that relates to the email thread (e.g., application ID followed 620, entity ID being followed 630), the social artifact that it has been promoted to (e.g., target ID for update notification), the expressions of interest (names of individuals tracking this, e.g., follower ID(s) 640), etc. Modifications on the social software system and participating applications on the computing platform (e.g., computing platform 450, FIGS. 4 and 5) subsequently leverage the same metadata, aggregated in a relational store (e.g., relational repository 440) to which both have access, and from which one or more embodiments may enforce the behaviors and interests expressed via a set of business process execution language (BPEL) rules that execute in the context of a business process management (BPM) workflow system. In one embodiment, subsequent changes to both the productivity application entity and social artifact (trivial) are then made to enforce these rules, allowing the desired functionality to surface in the way described. In one embodiment, the notification type 660 may include a notification that an update to the entity occurred, a notification including the update information, a notification that another follower/subscriber has been added (and optionally the current number of followers), etc. based on a follower/subscriber selection.

In one or more embodiments, all possible data and content sources may be potential social media sources. This is a fundamentally a different paradigm to what is seen in Social Media solutions today (e.g. IBM CONNECTIONS, GOOGLE+, FACEBOOK, LINKEDIN, TWITTER, MS SHAREPOINT, etc.). Likewise, this has the natural consequence of displacing content from conventional desktop productivity systems to social artifacts, where they may be stored and matured in these locations and accessed through multiple electronic devices.

In motivating movement from productivity applications to social platforms/applications/apps/forums, one or more embodiments comprise appropriate cues from the social network service, encouraging the collaboration participants to continue to progress the collaboration on the social site versus the productivity application (e.g., email, IM, blog, chat, etc.). These cues occur at the point in time a response in the productivity application is being motivated via the social media service, or naturally on the basis that the logical structuring and ordering on the social media server implicitly motivates participants to move there instead. In one embodiment, in instances where both occur (e.g., a subset continues to use the social media service in maturing collaborations, a subset continues to use productivity collaboration tools, etc.), the social media service accommodates both, as well as promoting content to the social media service and emailing individuals of any updates made (with an optional link to the change/response).

Figure 7:
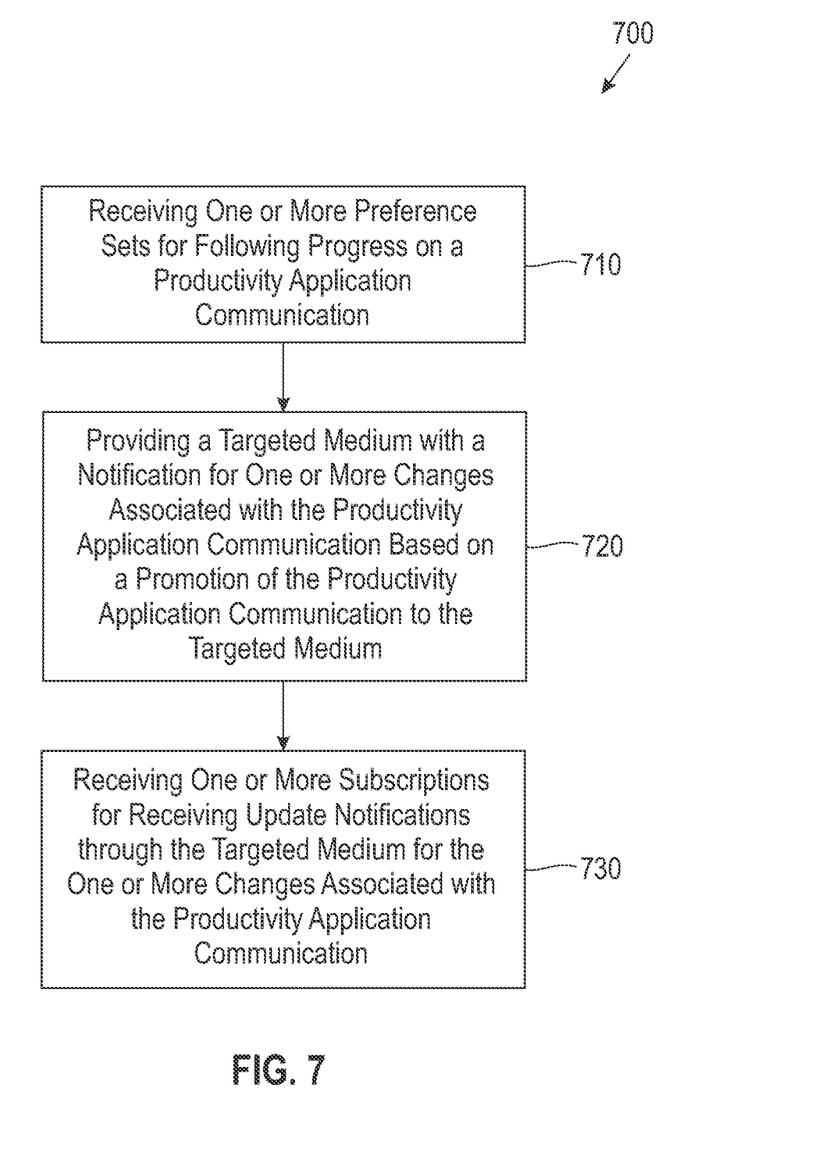
FIG. 7 is a block diagram of a process for following/subscribing and promoting threads from productivity applications with social media platforms, according to an embodiment.

FIG. 7 is a block diagram of a process 700 for following/subscribing and promoting threads from productivity applications with social media platforms, according to an embodiment. In one embodiment, in block 710 the process 700 performs receiving (e.g., by an update processor, such as update processor 540, or follow and update processors 401, 402, 403 and 404), one or more preference sets (e.g., metadata 600, FIG. 6) for following progress on a productivity application communication (or entity). In one embodiment, in block 720 the process 700 provides (by the update processor), a targeted medium (e.g., social media platform/application/app) with a notification for one or more changes associated with the productivity application communication based on a promotion of the productivity application communication to the targeted medium. In one embodiment, in block 730 process 700 receives (e.g., by the update processor) one or more subscriptions (e.g., followers) for receiving update notifications through the targeted medium for the one or more changes associated with the productivity application communication.

In one embodiment, process 700 may further include that updates to the productivity application communication are communicated on multiple electronic devices that are configured within a particular preference set, for multiple forms of synchronous and asynchronous message types. In one embodiment, a preference set includes information for a followed entity and a targeted medium ID. In one embodiment, the preference set further includes notification type.

In one embodiment, the productivity communication being promoted is represented as an object associated with metadata comprising information from the preference set for managing the object. In one embodiment, modifications on the targeted medium and participating productivity applications subsequently leverage the metadata, aggregated in a common accessed relational repository (e.g., relational repository 440), behaviors and interests are expressed via a set of BPEL rules that execute in a context of a BPM workflow system, and subsequent changes to both a particular participating productivity application and social artifact enforce the BPEL rules.

In one embodiment, notifications about the one or more subscriptions are forwarded to original members of a thread for the productivity application communication, and one or more communications associated with the one or more subscriptions are forwarded as an update to the thread for the productivity application communication. In one embodiment, process 700 may provide that a targeted medium comprises a social media platform, and a productivity application comprises an email application, a CRM application, an instant messaging application or a persistent team chat room platform.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A method for following asynchronous and synchronous productivity application communications comprising:
    providing, by an update processor, a targeted medium with a notification for changes associated with a productivity application communication based on a promotion of the productivity application communication to the targeted medium; and
    receiving, by the update processor, subscriptions for receiving update notifications through the targeted medium for the changes associated with the productivity application communication,
    wherein behaviors and interests are expressed via a set of rules that execute in a context of a workflow system, and subsequent changes to both a particular participating productivity application and social artifact enforce the set of rules.

2. The method of claim 1, wherein updates to the productivity application communication are communicated on a plurality of electronic devices that are configured within a particular preference set, for multiple forms of synchronous and asynchronous message types.

3. The method of claim 1, wherein a preference set includes information for a followed entity, notification type and a targeted medium identification (ID), data entities are tagged as a potential artifact, and once a data entity is tagged a social media service is informed and triggered resulting in a relationship between a running social media application and social media service is established surrounding the tagged data entity.

4. The method of claim 3, wherein the productivity communication being promoted is represented as an object associated with metadata comprising information from the preference set for managing the object.

5. The method of claim 4, wherein the metadata comprises a format including a follow tag field, an application ID followed, an entity ID being followed, a follower ID, a target ID for update or notification, a notification type and notification frequency.

6. The method of claim 4, wherein modifications on the targeted medium and participating productivity applications subsequently leverage the metadata, aggregated in a common accessed relational repository, the set of rules comprise a set of business process execution language (BPEL) rules, and the workflow system is a business process management (BPM) workflow system.

7. The method of claim 4, wherein notifications about the subscriptions are forwarded to original members of a thread for the productivity application communication, and communications associated with the subscriptions are forwarded as an update to the thread for the productivity application communication.

8. The method of claim 1, wherein a targeted medium comprises a social media platform, a productivity application comprises an email application, a customer relationship management (CRM) application, an instant messaging application or a persistent team chat room platform, and the update processor is implemented on a separate platform from productivity applications.

9. A computer program product for following asynchronous and synchronous productivity application communications, the computer program product comprising a computer readable storage medium having program code embodied therewith, the program code executable by an update processor to:
    provide, by the update processor, a targeted medium with a notification for changes associated with a productivity application communication based on a promotion of the productivity application communication to the targeted medium; and
    receive, by the update processor, subscriptions for receiving update notifications through the targeted medium for the changes associated with the productivity application communication,
    wherein behaviors and interests are expressed via a set of rules that execute in a context of a workflow system, and subsequent changes to both a particular participating productivity application and social artifact enforce the set of rules.

10. The computer program product of claim 9, wherein updates to the productivity application communication are communicated on a plurality of electronic devices that are configured within a particular preference set, for multiple forms of synchronous and asynchronous message types.

11. The computer program product of claim 10, wherein a preference set includes information for a followed entity, a targeted medium identification (ID) and notification type, data entities are tagged as a potential artifact, and once a data entity is tagged a social media service is informed and triggered resulting in a relationship between a running social media application and social media service is established surrounding the tagged data entity.

12. The computer program product of claim 11, wherein the productivity communication being promoted is represented as an object associated with metadata comprising information from the preference set for managing the object, and the metadata comprises a format including a follow tag field, an application ID followed, an entity ID being followed, a follower ID, a target ID for update or notification, a notification type and notification frequency.

13. The computer program product of claim 11, wherein modifications on the targeted medium and participating productivity applications subsequently leverage the metadata, aggregated in a common accessed relational repository, the set of rules comprise a set of business process execution language (BPEL) rules, and the workflow system is a business process management (BPM) workflow system.

14. The computer program product of claim 13, wherein notifications about the subscriptions are forwarded to original members of a thread for the productivity application communication, and communications associated with the subscriptions are forwarded as an update to the thread for the productivity application communication.

15. The computer program product of claim 9, wherein a targeted medium comprises a social media platform, and the update processor is implemented on a separate platform from productivity applications.

16. The computer program product of claim 9, wherein a productivity application comprises an email application, a customer relationship management (CRM) application, an instant messaging application or a persistent team chat room platform.

17. A system comprising:

an update processor that provides a targeted medium with a notification for changes associated with a productivity application communication based on a promotion of the productivity application communication to the targeted medium, and receives subscriptions for receiving update notifications through the targeted medium for the changes associated with the productivity application communication; and a relational storage device that aggregates metadata such that modifications on the targeted medium and participating productivity applications subsequently leverage the metadata from the relational storage device, wherein behaviors and interests are expressed via a set of rules that execute in a context of a workflow system, and subsequent changes to both a particular participating productivity application and social artifact enforce the set of rules.

18. The system of claim 17, wherein:

the productivity communication being promoted is represented as an object associated with metadata comprising information from the preference set for managing the object;

updates to the productivity application communication are communicated on a plurality of electronic devices that are configured within a particular preference set, for multiple forms of synchronous and asynchronous message types;

notifications about the subscriptions are forwarded to original members of a thread for the productivity application communication, and communications associated with the subscriptions are forwarded as an update to the thread for the productivity application communication; and data entities are tagged as a potential artifact, and once a data entity is tagged a social media service is informed and triggered resulting in a relationship between a running social media application and social media service is established surrounding the tagged data entity.

19. The system of claim 17, wherein:

the set of rules comprise a set of business process execution language (BPEL) rules;

the workflow system is a business process management (BPM) workflow system; and the metadata comprises a format including a follow tag field, an application ID followed, an entity ID being followed, a follower ID, a target ID for update or notification, a notification type and notification frequency.

20. The system of claim 19, wherein a targeted medium comprises a social media platform, and a productivity application comprises an email application, a customer relationship management (CRM) application, an instant messaging application or a persistent team chat room platform.

* * * * *